April 18, 1950 A. W. STORM 2,504,603
RESISTANCE CAPACITANCE OSCILLATOR
Filed Nov. 21, 1946
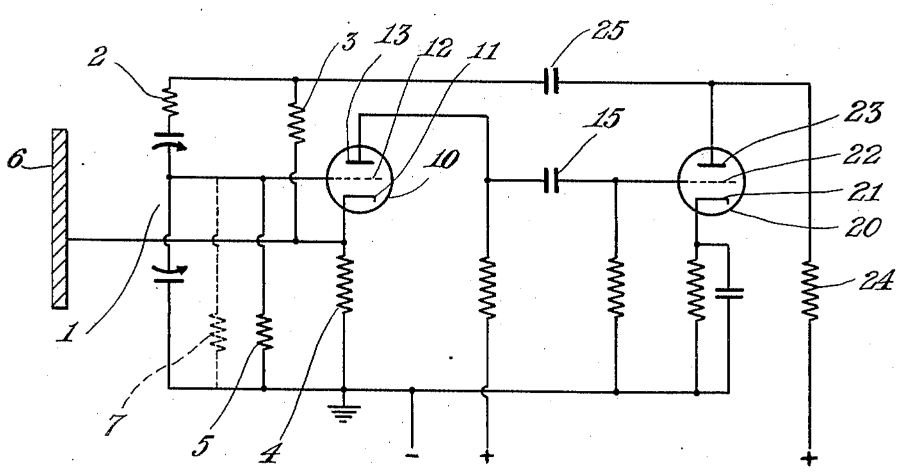
ANDRE WILLEM STORM
INVENTOR.
BY Fred M Vogel
AGENT.

Patented Apr. 18, 1950 2,504,603

UNITED STATES PATENT OFFICE 2,504,603

RESISTANCE CAPACITANCE OSCILLATOR

André Willem Storm, Sydney, New South Wales, Australia, assignor to Hartford National Bank & Trust Company, Hartford, Conn., as trustee Application November 21, 1946, Serial No. 711,431
In Australia June 19, 1945

Section 1, Public Law 690, August 8, 1946
Patent expires June 19, 1965

3 Claims. (Cl. 250—36)

In many types of resistance capacitance oscillators, the frequency of the generated voltage is determined by two circuits containing resistance and capacity components. It is common practice to make like components in the two circuits, equal to each other. Hence, it is convenient to use a two-gang variable condenser such as is employed in radio receivers for the capacity components so that the circuits may be adjusted simultaneously.

When such a two-gang variable condenser is used, the frame and rotor of the condenser must frequently be connected to the control grid of one of the valves in the oscillator, with one of the stator plates connected to earth and the other set of stator plates connected to a point which, so far as alternating current potentials are concerned, is not at earth potential. Hence, if any leakage occurs from the rotor or frame to earth, the leakage path is in parallel with that section of the gang condenser whose stator is earthed.

The resistances used in such circuits are frequently of very high value and the shunting effect of this leakage from the rotor and frame of the condenser to earth may materially affect the value of the resistance in the circuit. As this leakage is a variable factor dependent upon many matters such as atmospheric conditions, the stability and performance of the oscillator is adversely affected.

The primary object of this invention is to provide means whereby the adverse effects of this leakage may be minimized.

In one practical form of the invention, the frame of the gang condenser (including, if desired, other components connected to the frame such as the tuning control) is mounted on, but insulated from, a metal or electrically conductive support such as a guard plate or screen which is, in turn, insulated from the oscillator chassis or earth. The guard plate or screen is connected either to the cathode of the first valve of the oscillator or to a point in the oscillator circuit whose alternating current potential is approximately equal to and in phase with the potential acquired by the frame of the gang condenser.

When the guard plate or screen is connected to the cathode of the first valve, the effect of the leakage may be minimized by applying negative feedback to the first stage of the oscillator in such a manner that the effective input admittance of the oscillator, measured between the control grid and cathode of the first valve, is materially decreased, thus reducing the adverse effects of the leakage as the resistance of the leakage path, will, in effect be so much increased that the leakage will not materially affect the performance of the oscillator.

When the guard plate or screen is connected to a point having an alternating current potential equal to and in phase with that of the frame of the gang condenser, no difference of potential will exist across the leakage path between the frame of the gang condenser and the guard plate or screen and therefore the leakage will be ineffective.

The oscillator shown in the drawing comprises a first valve 10 having cathode, grid and anode electrodes 11, 12 and 13, respectively, and a second valve 20 having cathode, grid and anode electrodes 21, 22 and 23 respectively. The anode 13 is energized from a source (not shown) through a load resistor 14 and is coupled to the grid 22 through a blocking capacitor 15. The input circuit of valve 10 comprises a positive feedback frequency determining network comprising a dual capacity variable condenser 1, a resistor 2 connected in series with condenser 1 and a resistor 5 connected in shunt with the lower section of the condenser 1. The rotor of condenser 1 is connected to the frame of the condenser and to the grid 12. The input circuit of valve 10 also comprises a negative feedback network comprising series connected resistances 3 and 4 the junction of which is connected to the cathode 11. The said two networks are coupled to the anode 23 of valve 20 through a capacitor 25 and the anode is energized through a load resistance 24 from a suitable source (not shown) of anode potential. The circuit so far specifically described conforms to standard practice and is found for example in U. S. Patent No. 2,268,872 issued to W. R. Hewlett on January 6, 1942.

If any leakage exists between the frame of the condenser and earth, it will appear as a resistance 7 in parallel with the resistance 5 and will affect the frequency of the voltage generated by the oscillator. Similarly any capacitance to earth from the frame of the condenser will also affect the frequency of the generated voltage.

According to the invention, the condenser is mounted on a guard plate or screen denoted by the numeral 6 which is connected to a point in the circuit having a similar alternating current potential to the frame of the condenser. Leakage to the guard plate or screen 6 from the condenser frame will therefore have little effect.

In the drawing, the guard plate or screen is shown connected to the cathode of the first valve which has an impedance 4 connected in its cathode circuit. As is well known the presence of such an impedance causes the cathode potential to follow the grid potential and therefore this arrangement will decrease the effect of stray resistances and capacitances from the frame of the condenser to the guard plate or screen 6. Alternatively the guard plate or screen 6 may be connected to the junction point of two resistors or impedances 3 and 4 which are so proportioned that the junction point is at approximately the same potential with respect to earth for alternating currents as the frame of the condenser.

Having now described my invention, what I claim as new and desire to secure by Letters Patent is:

1. A resistance capacitance oscillator comprising an electrically conducting circuit component operating at ground potential, a discharge tube having a cathode, a control grid operating at a potential and phase different from the potential and phase of said circuit component and an anode, a frequency determining network comprising a multiple section variable condenser having a frame member and having rotor sections coupled to said control grid and operating at the potential and phase of said control grid, said frame member being mounted on and being electrically insulated from said electrically conducting circuit component, a feedback network coupled between the anode and control grid, means coupled to the feedback network to provide a circuit point having a potential and phase substantially equal to the potential and phase of the control grid, an electrically conducting shield member interposed between and electrically insulated from said frame member and said circuit component, and means to connect said shield member to said circuit point.

2. A resistance capacitance oscillator comprising an electrically conducting circuit component, a discharge tube having a cathode, a control grid and an anode, a feedback network coupled to the anode, a frequency determining network comprising a multiple section variable condenser having a frame member, two rotor sections and two stator sections, means to connect one of said stator sections to said feedback network, means to connect the other of said stator sections to said circuit component, means to connect said frame member and said rotor sections to the control grid, said frame member being mounted on and being electrically insulated from said circuit component, a series circuit comprising two impedance elements connected between said feedback network and said circuit component, an electrically conducting shield member interposed between and electrically insulated from said frame member and said circuit component, and means to connect said shield member to the junction of said impedance elements.

3. A resistance capacitance oscillator comprising an electrically conducting circuit component, a discharge tube having a cathode, a control grid and an anode, a feedback network coupled to the anode, a frequency determining network comprising a multiple section variable condenser having a frame member, two rotor sections and two stator sections, means to connect one of said stator sections to said feedback network, means to connect the other of said stator sections to said circuit component, means to connect said frame member and said rotor sections to the control grid, said frame member being mounted on and being electrically insulated from said circuit component, a series circuit comprising two impedance elements connected between said feedback network and said circuit component, an electrically conducting shield member interposed between and electrically insulated from said frame member and said circuit component, and means to connect said shield member and the cathode to the junction of said impedance elements.

ANDRÉ WILLEM STORM.

REFERENCES CITED

The following references are of record in the file of this patent:

UNITED STATES PATENTS

| Number | Name | Date |
|---|---|---|
| 2,173,427 | Scott | Sept. 19, 1939 |
| 2,268,872 | Hewlett | Jan. 6, 1942 |